United States Patent [19]
Weissrich et al.

[11] Patent Number: 5,749,617
[45] Date of Patent: May 12, 1998

[54] MOTOR VEHICLE ROOF WITH A CONTROL BY WHICH IT CAN BE OPENED BY MOTOR THROUGH VARIOUS INTERIM STAGES

[75] Inventors: Alfons Weissrich, Gautin; Martin Danzl, München; Johann Mayer, Petershausen, all of Germany

[73] Assignee: Webasto Karosseriesysteme GmbH, Stockdorf, Germany

[21] Appl. No.: 414,215

[22] Filed: Mar. 31, 1995

[30] Foreign Application Priority Data

Mar. 31, 1994 [DE] Germany .................. 44 11 388.9

[51] Int. Cl.$^6$ .................................................. B60J 7/00
[52] U.S. Cl. .................. 296/107; 296/117; 296/223; 200/11 R
[58] Field of Search .................. 296/223, 107, 296/117; 200/11 R, 564

[56] References Cited

U.S. PATENT DOCUMENTS

| | | | |
|---|---|---|---|
| 2,258,072 | 10/1941 | Stansbury | 200/11 R |
| 2,498,651 | 2/1950 | Crom | 200/11 R X |
| 2,528,345 | 10/1950 | DeChamps | 200/11 R |
| 2,770,489 | 11/1956 | Garvey et al. | 296/117 |
| 3,952,176 | 4/1976 | Holder et al. | 200/11 R |
| 4,556,835 | 12/1985 | Vogel et al. | 318/663 |
| 4,629,953 | 12/1986 | Inoue et al. | 296/223 X |
| 5,558,388 | 9/1996 | Webasto | 296/108 X |

FOREIGN PATENT DOCUMENTS

| | | | |
|---|---|---|---|
| 554694 | 8/1993 | European Pat. Off. | 296/107 |
| 121115 | 6/1985 | Japan | 296/107 |

*Primary Examiner*—Dennis H. Pedder
*Attorney, Agent, or Firm*—Sixbey, Friedman, Leedom & Ferguson, P.C.; David S. Safran

[57] ABSTRACT

A motor vehicle roof which can be opened by a motor through various interim stages by operation of a rotary switch about which graphic symbols are arranged which indicate the respective opening stages. The control is suited for triggering complex, openable motor vehicle roofs with several roof components which can be activated partially independently of one another and which can be activated by separate motors, the switch, as it turns in different peripheral areas, triggering individual or multiple motors in succession or at the same time for starting predetermined opening stages.

10 Claims, 1 Drawing Sheet

MOTOR VEHICLE ROOF WITH A CONTROL BY WHICH IT CAN BE OPENED BY MOTOR THROUGH VARIOUS INTERIM STAGES

BACKGROUND OF THE INVENTION

1. Field of the Invention

The invention relates to a control for a motor vehicle roof which can be opened by a motor via different interim stages, the motor being actuated with a rotary switch about which graphic symbols are arranged which indicate the respective opening stage produced when the switch moved into alignment therewith.

2. Description of Related Art

A control is known from U.S. Pat. No. 4,556,835 which is used to preset a desired position of the cover of a conventional sliding-lifting roof. An opening movement of the cover which deploys its rear edge above a fixed roof surface is preset by moving the control, proceeding from a zero position in one direction, while moving from the zero position in the other direction selects opening of the cover by moving it under the stationary roof surface. The different cover positions are produced with a single drive which is triggered by the known control. Graphic symbols representing the respective types of opening movement are associated with the opposite paths of movement of the switch, which may be a slide switch or a rotary switch.

SUMMARY OF THE INVENTION

The object of this invention is to make available a control which is suitable for activating more complex motor vehicle roofs with several drives.

This object is achieved by the features of the invention wherein the openable vehicle roof includes several roof components which can be activated in part independently of one another and which can be activated by separate drives and wherein a switch, when turned to various peripheral areas, triggers one or more drives to start predetermined opening stages in succession or at the same time. In doing so, according to the invention, several roof components which can be activated partially independently of one another and which can be activated by separate drives are triggered by a switch which, as it turns, traverses different peripheral areas in which individual or multiple drives are activated in succession or at the same time for starting predetermined opening stages. By means of the control according to the invention easy, one-handed operation of a motor vehicle roof consisting of several openable roof components is enabled.

In a preferred embodiment, when the switch is turned, proceeding from a zero position which corresponds to the closed position of the roof, in one direction of rotation, to a first peripheral area, the motor of a wind deflector plate which can be deployed at the forward edge of the roof opening is triggered. This wind deflector plate, advantageously, exposes a ventilation gap in the forward area of the roof via several interim positions.

It is furthermore advantageous when the switch is turned to a second peripheral area the motor for at least one sliding cover which can be displaced in the longitudinal direction of the vehicle is triggered. This second peripheral area for triggering the at least one siding cover, advantageously, adjoins the first peripheral area for triggering the wind deflector plate. In this way, first the wind deflector plate and then the sliding cover are activated in succession until completely opened. The opened wind deflector plate remains in the deployed state while the sliding cover is being opened and is used to deflect the airstream over the roof opening exposed by the sliding cover.

It has been found to be ergonomically favorable when the first peripheral area and second peripheral area together claim an angle of switch rotation of roughly 180°.

Advantageously, the individual peripheral areas have intermediate catches for setting intermediate positions. In this way, the operator, without having to take his eyes off the road, tactilely recognize the position set at the time by a slight perceptible change in the turning resistance, and optionally, in addition, by an acoustic signal, for example, in the form of a click, when passing through the intermediate catches.

According to another advantageous feature, it is provided that, by activating the switch, additional roof components such as usually fixed side and rear roof parts, together with the opened sliding cover(s) can be moved into a stowage space in the rear part of the motor vehicle to create a convertible-like roof opening. In a control of this type, the switch, proceeding from the zero position in an opposite direction of rotation away from the first peripheral area, an operating range which is used to trigger the drives of all roof components for completely closing the roof is obtained. It is furthermore advantageous if this switch, adjoining the second peripheral area, has an operating range which is used to trigger the drives of the other roof components for complete opening of the roof. By means of this layout of the control, it is also suitable for triggering such a complex vehicle roof as one which can be converted from a sedan-type vehicle with fixed component roof parts into a convertible-type vehicle.

To increase the operating safety of a roof of this type which can be completely opened, it is advantageous if the switch operating ranges for completely closing or opening the roof are designed as push-button switches. Since the operator must continuously activate the control in the desired direction of movement against spring pressure in this type of push-button switch function, it is guaranteed that individuals or articles are not unintentionally caught when the roof components move automatically.

To increase operating safety it is furthermore advantageous if activation of the switch in the operating ranges for complete closing or opening of the roof produces a warning signal when a certain speed of the vehicle is exceeded at the same time. In addition or alternatively it is advantageous when activation of the switch in these areas is blocked when a certain speed of the vehicle is exceeded at the same time. This guarantees that swinging movements of roof parts are suppressed in the speed ranges in which they would no longer be safe as the result of the dynamic pressure caused by the airstream or as the result of threatening distraction of other drivers due to spectacular movements.

Finally, it is advantageous if as another openable roof component there is a rear window which can be lowered, for the separate alternating opening and closing movement of which there is a momentary nonlocking switch located in a switch handle.

These and further objects, features and advantages of the present invention will become apparent from the following description when taken in connection with the accompanying drawings which, for purposes of illustration only, show a single embodiment in accordance with the present invention.

DETAILED DESCRIPTION OF THE PREFERRED EMBODIMENT

Figure 1:
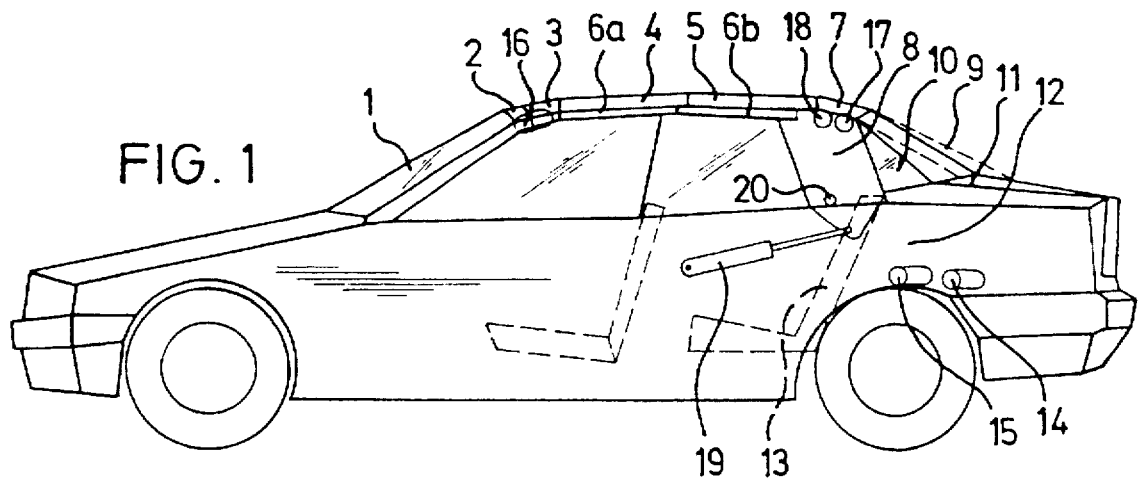
FIG. 1 shows a schematic longitudinal section through a motor vehicle with an openable vehicle roof.

In the vehicle shown in FIG. 1, front windshield 1 is adjoined by front crossbeam 2 which extends transverse over the top edge thereof and a wind deflector plate 3 which is pivotally attached to the crossbeam. To the rear, front sliding cover 4, rear sliding cover 5 and rear roof part 7 adjoin wind deflector plate 3. On either side of sliding cover 4 and 5 are side roof parts 6a, 6b which have guide rails, which are not shown, for guidance of sliding covers 4 or 5. Side roof parts 6a and 6b are pivotally attached on rear roof part 7 and are detachably connected to front crossbeam 2. Rear roof part 7 rests on either side on C-columns 8 which establish the connection to the under part of the vehicle. In the embodiment shown, a rear roof part 7 and two C-columns 8 form a closed roll bar.

Rear roof part 7 is adjoined to the rear by a rear window 9 which lies tightly against rear roof part 7 at its upper edge. At each side of rear roof part 7, between the rear window 9 and the C-columns 8, there is a triangular windows 10 which is mounted to fold inward on the C-columns.

Behind rear bench seat 13 of the vehicle is a stowage space 12 which can be covered by cover 11 for holding the complete roof. To move cover 11, to open or close stowage space 12, there is a drive 14 in the area of stowage space 12. In stowage space 12 is another drive 15 which is used for raising and lowering rear window 9. In front crossbeam 2, there is a drive 16 which deploys the wind deflector plate.

In rear roof part 7, there is a drive 17 for moving covers 4 or 5 and there is also drive 18 for pivoting movement of side roof parts 6a, 6b.

Preferably, a hydraulic drive 19, which is located in the rear area of the side walls of the vehicle, provides for swinging of the C-columns 8 with rear roof part 7 around pivot 20 into stowage space 12, when sliding covers 4 and 5 are accommodated under rear roof part 7 and side roof parts 6a and 6b are pivoted against rear roof part 7. To the extent described above such an openable motor vehicle roof is known from commonly owned, co-pending U.S. patent application Ser. No. 08/286,467, now U.S. Pat. No. 5,558,388 with respect to which two of the present inventors are co-inventors. To the extent necessary to complete an understanding of this application, U.S. Pat. No. 5,558,388 is hereby expressly incorporated by reference.

Figure 2:
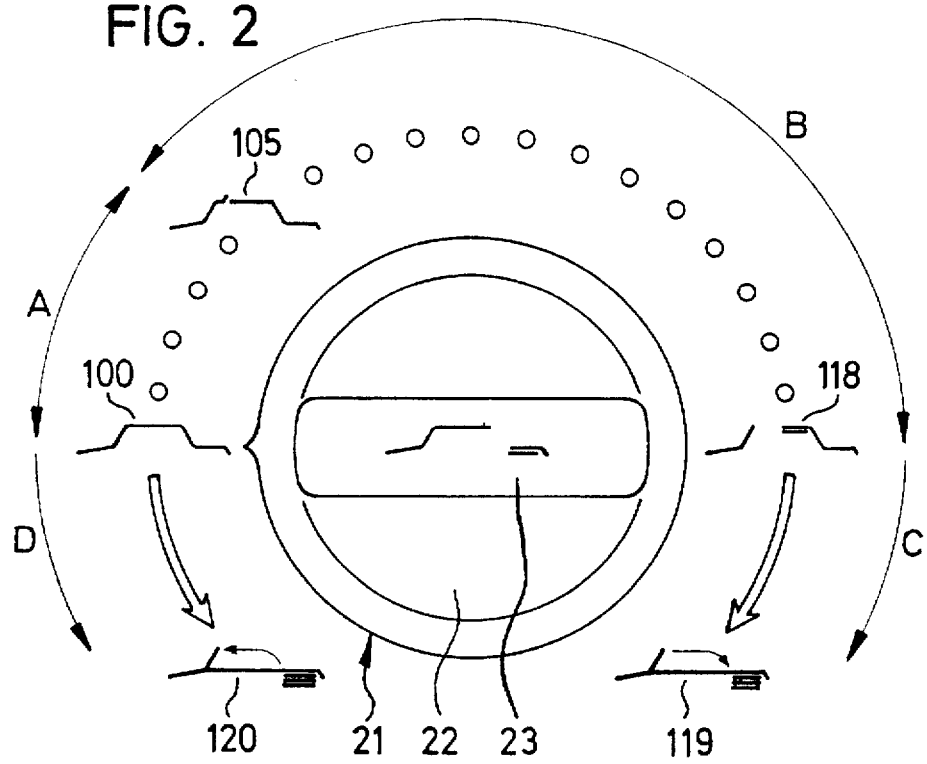
FIG. 2 shows a control suitable for operation of the vehicle roof of FIG. 1.

The control shown in FIG. 2 for activating the drives described in conjunction with FIG. 1 has a switch 21 which includes a knob 22 and nonlocking momentary pushbutton switch 23 integrated therein. Rotary switch 21 is peripherally surrounded with graphic symbols. The graphic symbols show opening positions of the vehicle roof defined in part in the manner of pictograms; other positions between the depicted opening positions are marked by dots as intermediate catches. In the representation in FIG. 2, switch 21 points to graphic symbol 100 which represents a zero position which corresponds to the completely closed position of the vehicle roof. Proceeding from this zero position, switch 21 is activated by turning it clockwise to the right through four intermediate positions to a switch position 105 which corresponds to complete deployment of wind deflector plate 3. The peripheral area between switch position 100 and switch position 105 is labelled A as the first peripheral area. In the same direction of rotation, proceeding from graphic symbol 105, the peripheral area A is followed by a peripheral area B which contains twelve intermediate catches and ends with a graphic symbol 118 which represents a completely opened state of two sliding covers 4 and 5. The intermediate catches, here, allow any intermediate positions in which, for example, after the first six intermediate catches symbolized by dots, first sliding cover 4 is completely opened, and continuing in steps second sliding cover 5 is opened. In the same clockwise direction of rotation to the right, second peripheral area B is adjoined by a switch operating range C with bottom end marked by a graphic symbol 119 which symbolizes complete opening of the entire vehicle roof and its stowage in rear stowage space 12.

Proceeding from the zero position at graphic symbol 100 shown in FIG. 2, in the counter-clockwise direction of rotation to the left, operating range A is adjoined by a switch operating range D which on its bottom end is bounded by graphic symbol 120, which signals complete closing of the vehicle roof from the completely opened or any intermediate state.

Activation in the switch operating ranges C and D for complete opening or closing of the vehicle roof is, preferably, executed as a pushbutton switch function, i.e., the operator must keep switch 21 depressed against the pressure of a spring with the switch pointer on graphic symbol 119 or 120, until the opening or closing process is completed in full. Premature release leads to interruption of the opening or closing process. This pushbutton control ensures that complete opening or closing of the vehicle roof can take place only with the continuous monitoring of the operator; this largely precludes catching of body parts or articles by the moving vehicle roof. It has proven ergonomically favorable if peripheral area A and peripheral area B jointly cover an angular range of switch 21 of roughly 180°. This angular range is preferably in the upper half of switch 21 in its position of use. In this way, it is indicated to the user that all activations of switch 21 in this area relate exclusively to components which move above his head on the roof. Conversely, activation of switch 21 in the lower half of the annulus (switch operating ranges C or D) has a signalling effect for him that, in this way, roof parts are moved into the area under the equator of the motor vehicle or are raised upwards again from it. Activation of switch 21 in switch operating ranges C or D for complete opening or closing of the vehicle roof is safeguarded according to one advantageous feature by which speed-dependent monitoring is performed. This safeguard can trigger a warning signal of the acoustic or optical type when switch 21 is activated above a certain speed range and/or can lead additionally to disabling of switch 21. This can be easily done electrically by incorporating into the circuit for the pushbutton switch functions of operating ranges C or D, a switch in series with it which is opened when a certain tachometer-dependent vehicle speed is exceeded, preferably a warning signal being delivered in addition.

Integrated into switch 21 or into its knob 22 is pushbutton toggle switch 23 which has a two-way switch function that causes complete lowering or in the next activation complete raising of rear window 9. This activation is possible, in part, independently of the other roof components. Thus, for example, the back window can be raised or lowered with the roof completely closed, with wind deflector plate 2 deployed, or with sliding covers 4 or 5 opened. Only when activated for complete opening of the roof (switch operating range C) is rear window 9, independently of the activation of pushbutton switch 23 in the normal course of opening of the entire vehicle roof, lowered at the same time if it is not already in this state. Conversely, when activated in switch operating range D for complete closing of the vehicle roof, rear window 9, independently of the prior activation of nonlocking momentary pushbutton switch 23, is raised at the same time in order to completely close the vehicle roof.

When the vehicle roof shown in FIG. 1 is activated in the normal manner, it is opened in stages depending on the weather conditions and driver requirements, such that, first, by turning switch 21 from graphic symbol 100 with the roof completely closed through the intermediate catches until switch position 105 is reached, wind deflector plate 3 is completely deployed. Afterwards, by further turning through peripheral area B, a desired intermediate position of sliding covers(s) 4 or 5 is established. In doing so, regardless of the position of wind deflector plate 3 or sliding covers 4 or 5 at the time, the rear window 9 can be raised or lowered. If further opening of the vehicle roof up to a convertible-type vehicle is desired, after covers 4 and 5 are completely retracted (corresponding to switch position 118), switch 21 is activated in operating range C in the direction to graphic symbol 119 and is held in this position until rear window 9 is lowered, if necessary, side roof parts 6a and 6b have been pivoted against rear roof part 7, cover 11 has been opened and the entire package of rear roof part 7, with side roof parts 6a, 6b folded against it and sliding covers 4 and 5 held therein, is lowered by being swung by means of drive 19 around center of gravity 20 into stowage space 12.

For closing the roof from the completely opened position, switch 21 is turned, from graphic symbol 118, 180° to the counterclockwise to the left to graphic symbol 100, and is activated from here, in operating range D to graphic symbol 120 against the spring-loading. In doing this, first drive 14 for cover 11 is activated for purposes of opening the latter, then drive 19 for swinging the rear roof part 7 up with C-columns 8 is operated, followed by operation of drive 18 for swinging out the side roof parts 6a, 6b into their extended position with subsequent locking thereof to the front crossbeam 2, then drive 17 for closing sliding cover 5 or 4, and finally, the drive 16 for closing wind deflector plate 3 activated. Parallel to swinging out of side roof parts 6a, 6b by means of drive 18, the rear window 9 is also moved into its raised closed position by drive 15. Afterwards, the drive 14 for cover 11 is activated for the purposes of closing the stowage compartment. After the closing process is completed, the actuating force is released and switch 21 springs back into its zero position, from graphic symbol 120 to switch position symbol 100.

By means of the above described control, comfortable, one-handed operation of a complex motor vehicle roof, having several drives which can be activated individually or jointly, has become possible.

While various a preferred embodiment in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. A motor vehicle roof comprising several movable roof components which are movable, at least in part, independently of one another by separate drives for partially exposing a roof opening in a roof surface of a motor vehicle in several interim positions and for completely exposing a passenger compartment of the motor vehicle in a convertible roof manner by stowing the entire roof, including all of said roof components, in a stowage space of the motor vehicle; wherein said separate drives are activated by a single rotary switch, the rotary switch, starting from a zero position, being rotatable in a first direction through sequentially arranged peripheral areas of the rotary switch in a first switch mode for opening said roof components one after another as each of said peripheral areas is reached by operation of one or more of said drives being selectively actuated for starting predetermined opening stages when a respective one the peripheral areas is reached, and being rotatable from said zero position in an opposite direction in a second switch mode for activating all of the drives in a predetermined sequence for completely closing the vehicle roof.

2. Motor vehicle roof according to claim 1, wherein the rotary switch has a starting position which corresponds to a fully closed position of the roof; and wherein the roof component caused to be opened by the rotary switch when turned from said starting position in said first direction of rotation, in a first peripheral area, is a wind deflector plate on a forward edge of the roof.

3. Motor vehicle roof according to claim 2, wherein the roof component caused to be opened by the rotary switch in a second peripheral area is a drive of at least one sliding cover which is displaceable in a longitudinal direction for opening and closing the roof opening in said roof surface.

4. Motor vehicle roof according to claim 3, wherein the second peripheral area adjoins the first peripheral area.

5. Motor vehicle roof according to claim 4, wherein the first peripheral area and the second peripheral area together span an angle of switch rotation of about 180°.

6. Motor vehicle roof according to claims 5, wherein there are intermediate position catches within the peripheral areas.

7. Motor vehicle roof according to claim 3, wherein the roof components caused to be opened by said rotary switch in a third peripheral area are side and rear roof components which are displaceable together with said movable components into a stowage space in a rear part of a motor vehicle to produce a convertible-type roof opening.

8. Motor vehicle roof according to claim 7, wherein the third peripheral area adjoins said second peripheral area.

9. Motor vehicle roof according to claim 7, wherein, as another openable roof component, a rear window which can be raised and lowered is provided.

10. Motor vehicle roof according to claim 3, wherein a rear window which can be raised and lowered is provided.

\* \* \* \* \*

UNITED STATES PATENT AND TRADEMARK OFFICE
CERTIFICATE OF CORRECTION

PATENT NO. : 5,749,617
DATED : May 12, 1998
INVENTOR(S) : Alfons Weissbrich, et al.

It is certified that error appears in the above-identified patent and that said Letters Patent is hereby corrected as shown below:

On the title page, Item [75]
    inventors name to read --WEISSBRICH--.

Signed and Sealed this

Twenty-ninth Day of December, 1998

Attest:

BRUCE LEHMAN

*Attesting Officer*      *Commissioner of Patents and Trademarks*